United States Patent [19]

Rozenstrauch et al.

[11] Patent Number: 5,313,652
[45] Date of Patent: May 17, 1994

[54] METHOD AND APPARATUS FOR PROVIDING A COMMUNICATION PATH USING COMMON SITES

[75] Inventors: Alexander Rozenstrauch, Buffalo Grove; Paul M. Erickson, Palatine, both of Ill.

[73] Assignee: Motorola, Inc., Schaumburg, Ill.

[21] Appl. No.: 857,560

[22] Filed: Mar. 25, 1992

[51] Int. Cl.$^5$ .............................. H04B 7/14
[52] U.S. Cl. ........................ 455/15; 455/17; 455/33.4; 455/34.1; 455/56.1
[58] Field of Search ............... 455/15–17, 455/33.3, 33.4, 34.1, 34.2, 53.1, 56.1; 379/59

[56] References Cited

U.S. PATENT DOCUMENTS

| | | | |
|---|---|---|---|
| 4,670,906 | 6/1987 | Thro | 455/56.1 |
| 4,723,264 | 2/1988 | Sasuta et al. | 379/58 |
| 4,799,253 | 1/1989 | Stern et al. | 455/34.1 |
| 5,058,199 | 10/1991 | Grube et al. | 455/56.1 |
| 5,095,529 | 3/1992 | Comroe et al. | 455/56.1 |
| 5,214,789 | 5/1993 | George | 455/56.1 |

Primary Examiner—Edward F. Urban
Assistant Examiner—Andrew Faile
Attorney, Agent, or Firm—James A. Coffing; Joseph P. Krause; Steven G. Parmelee

[57] ABSTRACT

A method of collapsing a communication path among at least two communication units (104–107) reduces the number of sites normally required to provide a communication. Each of a plurality of site controllers (103) in a radio communications system has a corresponding coverage area (100, 101), and at least some of the coverage areas (710–712) overlap one another. The method includes the step of determining (402) whether the communication units are currently being serviced by different sites, and then determining (405) whether they can be serviced by a common site. When the communication units are serviceable by a common site, the call might be established (406) through the common site, resulting in a reduced number of sites required to complete a call.

22 Claims, 4 Drawing Sheets

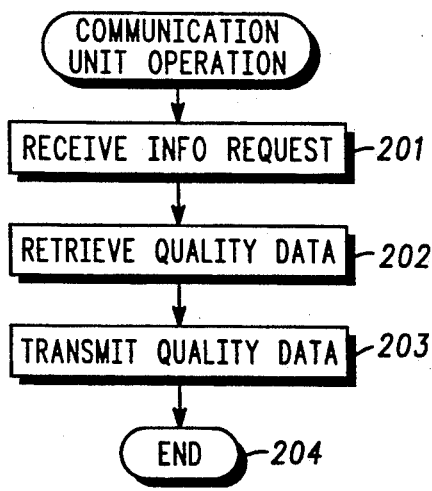
FIG.2
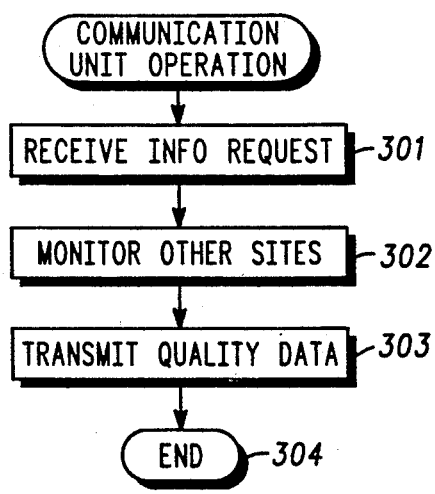
FIG.3
FIG.5
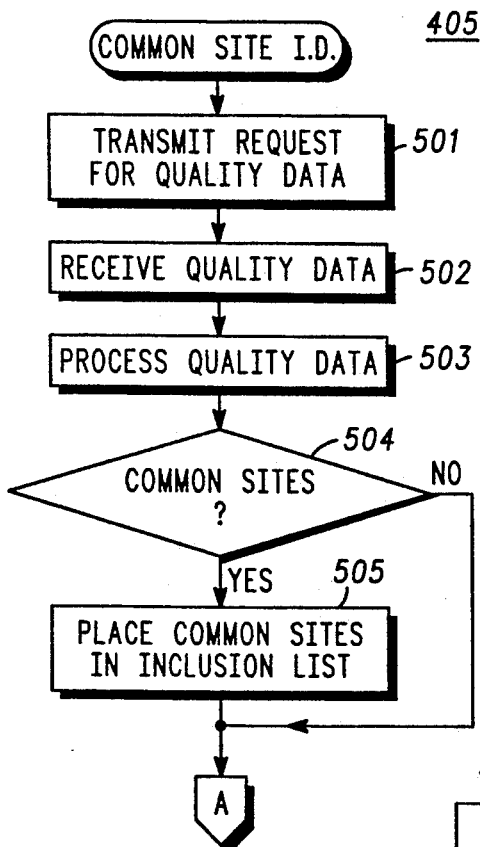
FIG.4
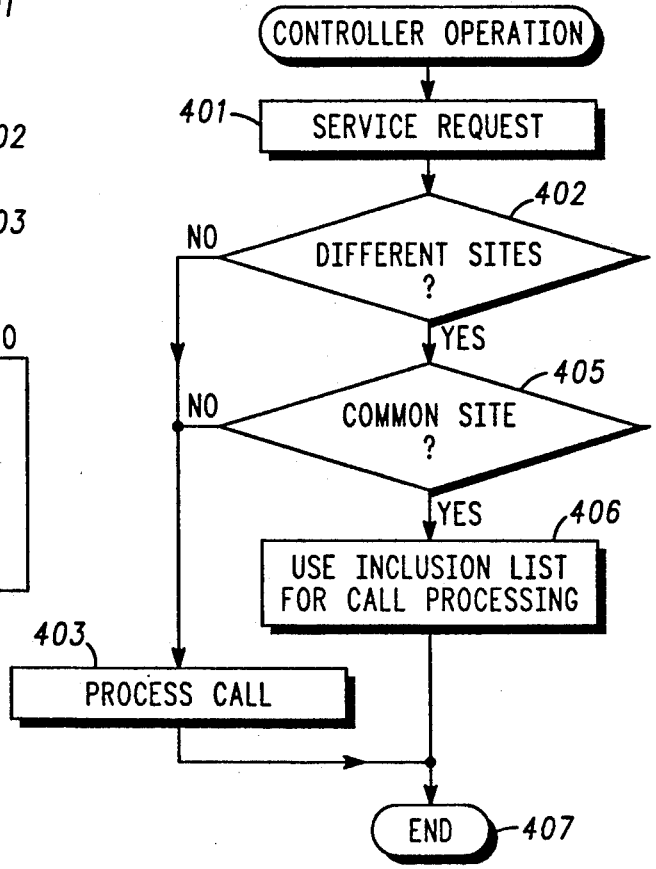

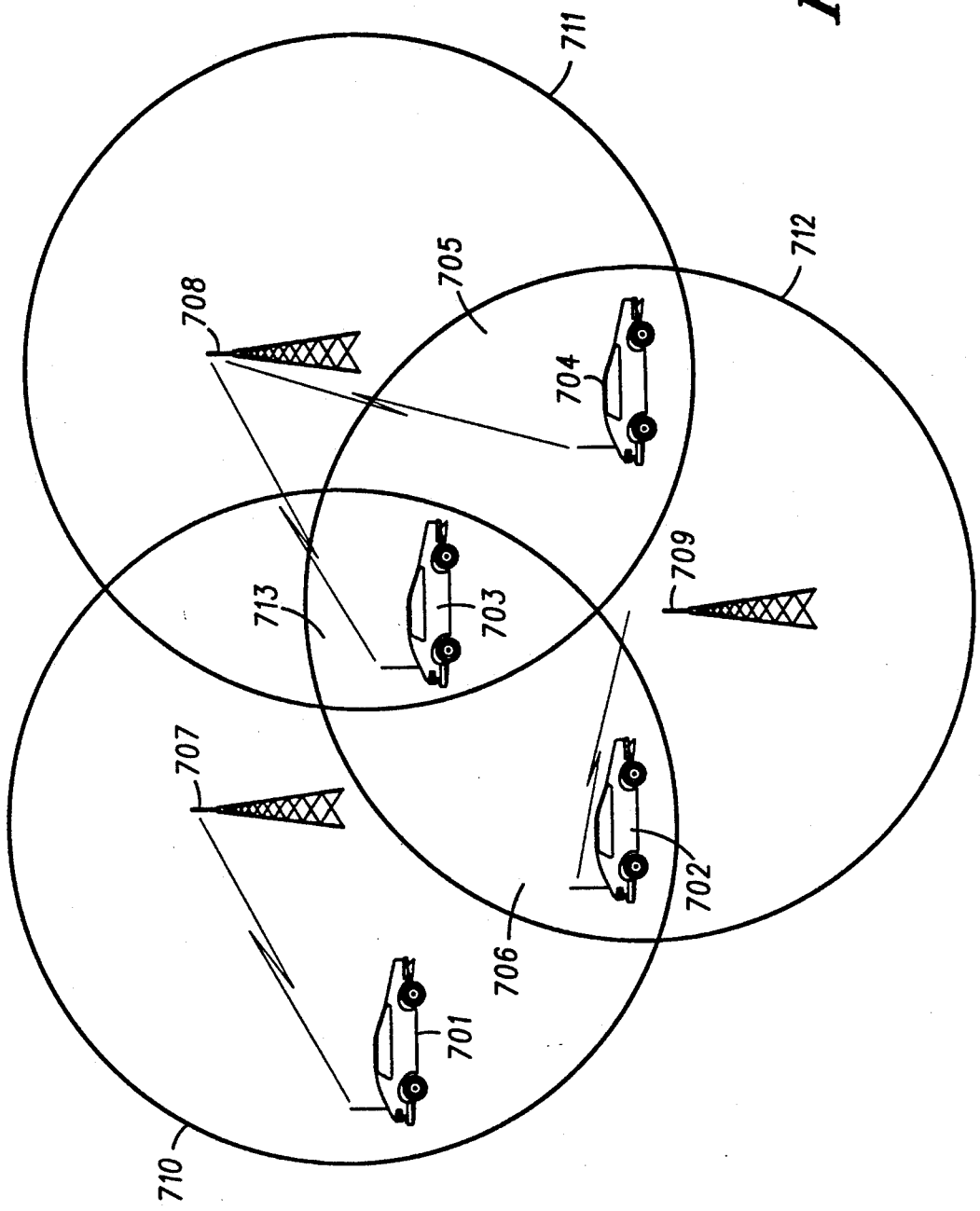

METHOD AND APPARATUS FOR PROVIDING A COMMUNICATION PATH USING COMMON SITES

FIELD OF THE INVENTION

The present invention relates generally to radio communication systems, and more particularly to such systems which provide a communication path using a common site to reduce the number of sites required to complete a call.

BACKGROUND OF THE INVENTION

Today's radio communications systems are able to provide communication coverage to communication units located throughout a large geographical area. Generally, this is accomplished by a plurality of smaller coverage areas, or sites, whose site controllers are linked via a regional network, to provide continuous coverage across the combined coverage areas. In multi-site arrangements, such as the one described, it is typical for the coverage areas of adjacent sites to overlap. That is, a communication unit located within the overlapped area may be able to communicate with the site controllers from either of two, or more, coverage areas.

When a trunked communication call is initiated, the voice signals for the call must reach each of the communication units which are to receive the call. That is, the voice path must traverse through each of the site controllers currently being used by the target communication units. For example, if each of five communication units are using different site controllers, a communication among these five communication units would necessarily include the participation of each of the five site controllers. However, because of overlapping coverage areas and the location of the communication units within such coverage areas, the required number of site controllers is often less than the total number being used at the time the call is made. Referring again to the example, suppose that three of the five communication units are located in an overlap coverage area which can be serviced by the same site controller. Note that this scenario, which is not at all uncommon, actually requires the use of only three site controllers to complete the call (i.e., one each for two isolated units, and one for the three units in the overlap area). Unfortunately, today's trunked communication systems make no attempt to reduce the number of site controllers needed to establish a voice path.

Accordingly, a trunked communications system which provided the ability to determine a reduced number of site controllers necessary to complete a call would be an advantage over the prior art. Further, a method which could be employed to collapse trunked calls to a reduced number of sites would enhance the efficiency, and hence through put of the communication system.

SUMMARY OF THE INVENTION

The present invention encompasses a method of collapsing a call between at least two communication units, such that the call requires less than the number of sites normally required to provide a communication path among the communication units. Each of a plurality of sites in a radio communication system has a corresponding coverage area, and at least some of the coverage areas overlap with one another. The method includes the step of determining whether the communication units are currently being serviced by different sites, and then determining whether they can be serviced by a common site. When the communication units are serviceable by a common site, the call is patched through the common site, a process referred to as collapsing.

BRIEF DESCRIPTION OF THE DRAWINGS

FIG. 2 is a simplified flow diagram depicting the operation of a communication unit, in accordance with one embodiment of the present invention.

FIG. 3 is a simplified flow diagram depicting the operation of a communication unit, in accordance with an alternate embodiment of the present invention.

FIG. 4 is a simplified flow diagram depicting the site selection method, in accordance with the present invention.

FIG. 5 is a simplified flow diagram depicting a method of identifying common sites, in accordance with the present invention.

FIG. 7 is a simplified graphical representation of a trunked communication system having three overlapping coverage areas for which a communication path is established, in accordance with the present invention.

DETAILED DESCRIPTION OF A PREFERRED EMBODIMENT

Figure 1:
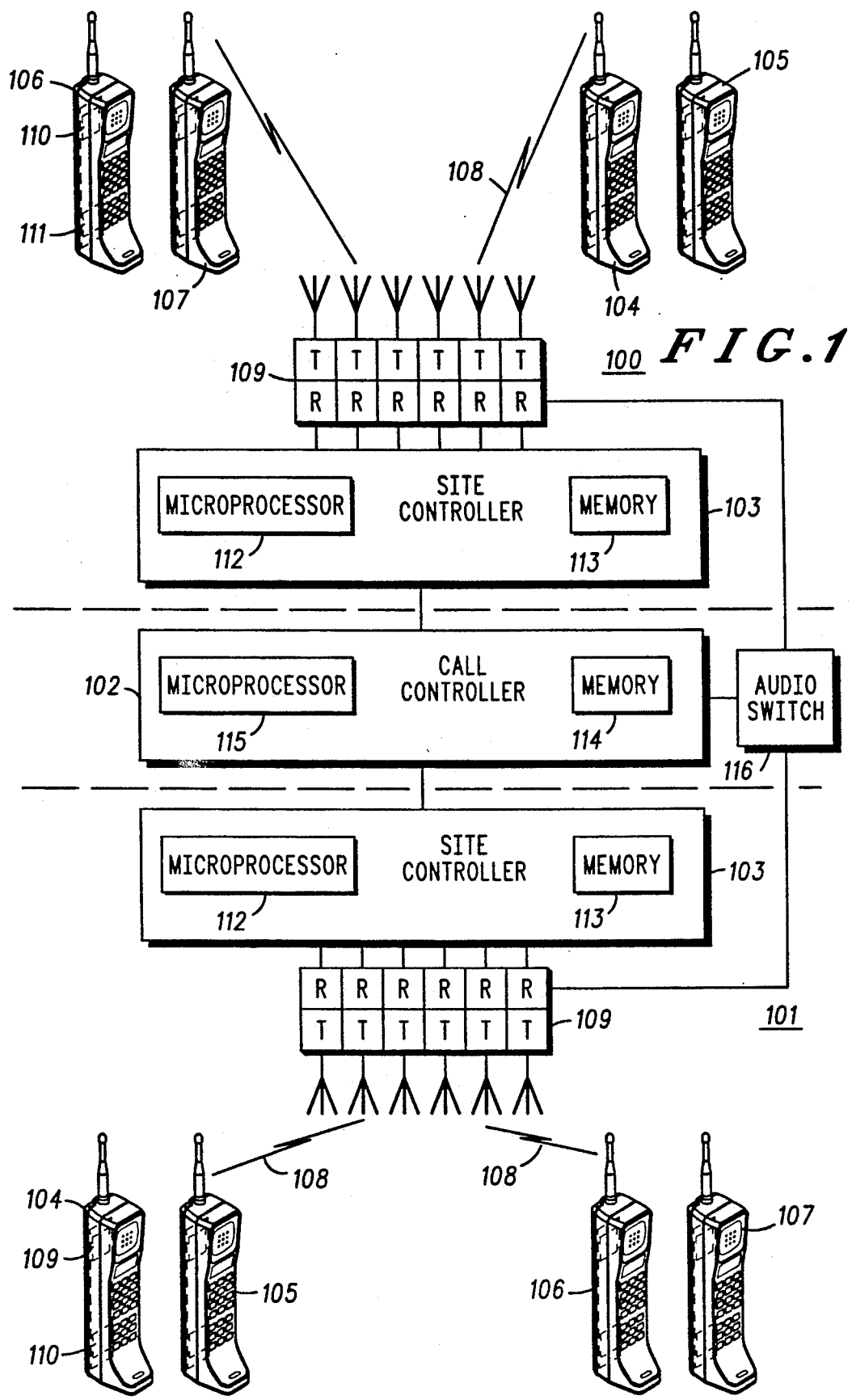
FIG. 1 is a simplified graphical representation of a trunked communication system, in accordance with the present invention.

FIG. 1 shows a radio communications system comprised of communication site controllers 103 (servicing coverage areas 100 and 101), central call controller 102, communication units 104–107, and a communication audio switch 116. Call controller 102, which may be a Motorola Integrated Radio System (MIRS) controller, comprises a microprocessor 115, which may be a Motorola 68040 microprocessor, and digital memory 114, which may be RAM, ROM, or any other type of means for storing digital information. Each communication site controller 103, which may be a Motorola remote central site controller, comprises a microprocessor 112, which may be a Motorola 68030 microprocessor, and digital memory 113, which may be RAM, ROM, or any type of means for storing digital information. Each of the communication units 104–107, which may be a MIRS portable, comprises a microprocessor 110, which may be a Motorola 68HC11 microprocessor, and digital memory 111, which may be RAM, ROM, or any other type of means for storing digital information.

The communication system of FIG. 1 is used to support various call types in which at least one call type might involve multiple communication units 104–107, which are represented as portable radios, but which might be mobile radios, consoles, or the like. While FIG. 1 illustrates two isolated communication sites, the present invention finds utility in configurations having overlapping coverage areas (e.g., units may be co-located within the coverage range of site controllers for sites 100 and 101, simultaneously).

Each of the site controllers 103 is suitably configured to manage the communication and control resources, which include a bank of repeaters 109. Site controllers 103 also route service requests, information requests, quality metrics, redirection commands, and channel grants between communication units 104-107 and call controller 102. Though repeater bank 109 is used for illustrative purposes, it is anticipated that the present invention applies equally well to single time domain multiple access (TDMA) repeaters, or the like, which use a single frequency to transceive signals in predetermined timeslots within that channel.

Communication paths 108, between repeaters 109 and communication units 104-107, provide bi-directional control and audio information, and may be either duplex or half-duplex. Further, a particular communication unit (e.g., 105) may be receiving its control information from any one site (e.g., 100,101) at a given moment; that site is referred to as its primary site, and the site controller as the primary controller. The same unit may travel such that it exceeds the range of its current primary site, and it might therefore start receiving its control from the entered site. Also, a communication unit may currently be receiving control from one site (e.g., 101), and signal quality metrics—or even control information—from one or more other sites (e.g., 100).

Calls are managed by call controller 102, which may be centrally located, co-located with one of the site controllers 103, or even co-resident as a separate function within the same physical microprocessor 112 found in one of the site controllers 103. (It should be noted that a preferred implementation would have the functions provided by a distributed call controller within each and every site controller 103). In this manner, some calls would be controlled by one site controller, while other calls could be simultaneously controlled by other sites. However site controller 102 is implemented, it should be equipped with a communication link to each of the system sites for exchanging control information. As mentioned earlier, site controller 102 contains a microprocessor 115, and associated memory 114—which is used as storage means for the microprocessor program, and for the inclusion list, as later described.

Audio switch 116 provides a connection between the various repeater banks 109, located at each of the communications sites, and is controlled by call controller 102. Communication links coupling switch 116 with repeater banks 109 might be any type suitable for such traffic, and may even be shared with the communication links between call controller 102 and site controllers 103. (Indeed, if compatible formats for audio and control information is utilized, not only may the communication links be shared, but switch 116, call controller 102, and one of the site controllers 103 may be implemented in a shared processor.)

FIG. 2 shows a simplified flow diagram depicting one embodiment of the communication unit operation. A communication unit might receive (201) an information request from its controlling site. The unit then retrieves (202), from its internal memory, a set of quality data, or metrics—which preferably consist of a power level, and a channel interference level—for a number of adjacent channels. The unit then sends (203) these quality metrics to its primary site controller. In an alternate embodiment, the communication unit might send only an indication of the sites that it can currently monitor (i.e., receive signals from). In this embodiment, the communication unit would have been continuously measuring the signal quality metrics (i.e. carrier-to-noise ratio, adjacent channel interference level, or any other parameter which indicates the quality of the received signals) as part of its ongoing operation. In still another embodiment, the communication unit might additionally send an expected return signal quality—predicted by the outbound signals receives power level, the transmitted indication of ERP (Effective Radiated Power), and the communication units known transmitter power.

FIG. 3 shows a simplified flow diagram depicting an alternate embodiment of the communication unit operation. A communication unit might receive (301) an information request from its primary controller. In response to this request, the communication unit monitors (302) (i.e., measures a set of quality metrics (e.g., power levels and channel interference levels)) for a number of adjacent channels. These channels might be predetermined, or they might be indicated as part of the information request. The communication unit then sends (303) the measured quality metrics to its primary controller. In a preferred embodiment, the data (i.e., quality metrics) is then forwarded to the call controlling site for use in determining whether the communication unit should be redirected.

FIG. 4 shows a simplified flow diagram depicting a preferred embodiment for the processing at the call controlling site. Call controlling site receives (401) a service request and determines (402) whether members of the group of communication units are being serviced by different sites. If not (i.e. single site call), then the controlling site simply processes (403) the single site call in a known fashion. If different sites are being employed by the group members, the controlling site determines (405) whether these units can be serviced by a common site. If not (e.g., multi-site call), then the controlling site simply processes (403) the multi-site call in a known fashion. If there are one, or more, common sites (as might be determined in accordance with FIGS. 5 and 6), then a reduced list of sites (e.g., inclusion list) is created (406). The inclusion list identifies a reduced set of sites which provide complete coverage for the targeted group of communication units. Thus, the inclusion list contains a set of common sites which might be employed to complete the call. If it is determined that more than one combination of sites could service the group, a preferred embodiment might use other criteria, such as outbound signal quality metrics, cost of air time, etc., to determine which site to add to the inclusion list.

In a preferred embodiment, communication units that are not currently being serviced by an included site are redirected to a site from the inclusion list (e.g., from which the best signal quality is measured). Conversely, those units which are currently being serviced by an included site continue to receive such service. Subsequent to the necessary redirecting, the call is processed (406) using the reduced number of sites found in the inclusion list. In an alternate embodiment, the call controller might redirect a communication unit whose signal quality could be improved by using another site from the inclusion list. Other embodiments, replacing all or a portion of blocks 402-406 are envisioned, such as the simplex method of linear programming could be used to find the absolute minimum number of common sites necessary to service the call. The present invention anticipates the need for reducing the computational complexity (i.e., simplifying the voice path configuration), but does not necessarily require finding an absolute minimum site configuration.

Figure 6:
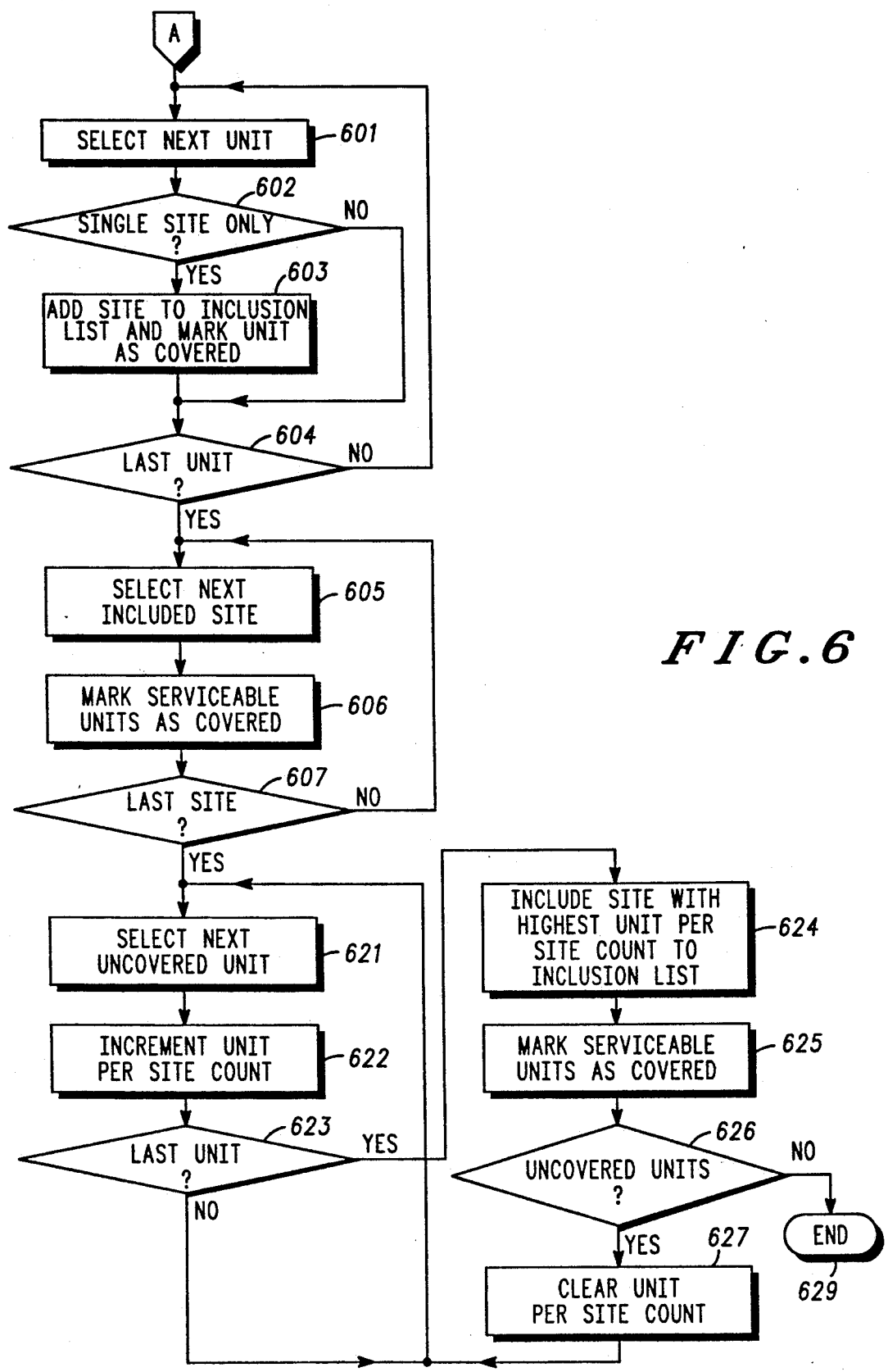
FIG. 6 is a continuation of the flow diagram shown in FIG. 5, depicting a method of identifying included sites, in accordance with the present invention.

FIGS. 5 and 6 show simplified flow diagrams depicting a preferred method of selecting common sites (i.e., generating an inclusion list), as required by the operation shown in FIG. 4. The controlling site transmits (501) a request for quality data (i.e., metrics) to each of the communication units in the group intended to receive the call. The controlling site then receives (502) quality metrics from at least some of the communication units in the group (i.e., communication units not sending quality data are treated as if they are single-site users). The controlling site processes (503) the received quality metrics (e.g., comparing received metrics with predetermined thresholds for adequate signal quality). A decision (504) is then reached to determine whether there any common sites among those reported by group members (i.e., sites which can be monitored by more than one unit). The identification for these sites are then placed (505) in the inclusion list (i.e., the inclusion list is altered to include these sites).

FIG. 6 illustrates subsequent levels of determining which sites are to be placed in the inclusion list. A communication unit (i.e., member of the targeted group) is first selected (601), and the current quality data is used to determine which site, or sites, can be adequately monitored by that unit. The controlling site determines (602) whether the unit can monitor only a single site. If so, the ID for the sole site is added (603) to the inclusion list, and the unit is marked as "covered" (e.g., by updating a portion of memory at the controlling site). This process is repeated for each communication unit in the group, until the last unit is checked. Once all the units have been checked (604) for single-site coverage, a site is selected from the updated inclusion list (605), and all units which can monitor the selected site are marked as covered (606). In like manner, all single sites placed in the inclusion list are processed, and the units that can monitor these sites are marked as covered (606). Once all the included sites have been processed (607), the controlling site determines (621-627) which sites are required to provide coverage to the uncovered units (i.e., those units which cannot monitor those sites whose ID's appear in the inclusion list), as hereafter described.

An uncovered communication unit is selected (621), and a counter for each site monitored by the unit (e.g., units-per-site count—a running tally of the number of units each site can currently service) is incremented (622). In like manner, processing continues until (623) all uncovered units are processed. At this stage in the process, the call controlling site determines which sites should be included, according to a predetermined set of criteria. That is, certain system configurations might be more advantageous than others, e.g., configurations involving a lesser number of sites. For illustration purposes, a simple algorithm is described which reduces, but does not necessarily minimize, the number of sites needed to complete the call.

Accordingly, the site with the highest units-per-site count is included (624) in the inclusion list (i.e., portion of memory updated, as earlier described). Those units which are serviceable by these sites are then marked (625) as covered, and a decision (626) is reached to determine if any uncovered units remain. If so, the units-per-site is cleared (627), and the process (621-627) is repeated until all units are covered, and the inclusion list is complete. The actual processing of the initiated call, using the sites identified in the inclusion list, was described in FIG. 4.

FIG. 7 shows a simplified graphical representation of a three site communication system which might be employed to process a call, in accordance with a preferred embodiment of the invention. Communication unit 701 receives control signals from site controller 707 (i.e., primary controller for coverage area 710), and can monitor no other site. Communication unit 702 receives control signals from site controller 709 (serving area 712), but can also monitor site controller 707, since it is located in overlap area 706. Communication unit 703 receives control signals from site 708, but is able to monitor sites 707 and 709, since it is located in overlap area 713. Lastly, communication unit 704 receives control signals from site 708, and can monitor site 709 since it is located in overlap area 705.

To illustrate a preferred embodiment of the invention, suppose unit 701 initiates a call request. A call controlling site (which might be any of the sites 707-709 shown in FIG. 7, or a central site) receives the request from site controller 707, and determines that unit 701 belongs to a communication group which contains units 702-704. Further, it is determined that unit 702 is currently being served by site 709, and units 703, 704 are being served by site 708. In accordance with the flow diagram shown in FIGS. 5 and 6, the call controlling site then transmits a request for quality metrics from the participating units. Upon receiving the quality metrics, the controlling site processes the information to produce an inclusion list, which process is herein described.

By executing blocks 601-604 of FIG. 6, the inclusion list will contain site 707, i.e., the only site with a unit which can only receive service from only one site. After execution of blocks 605-607 (not repeated since there is only one site in the inclusion list), the only communication unit remaining "uncovered" is unit 704 (i.e., unit 704 is the only unit which cannot receive service from site 707). The call controller then executes blocks 621-623 to determine that unit 704 can be serviced by either site 708 or 709 (i.e., both unit per site counts incremented in block 622). Since both site 708 and 709 have a count of one unit per site, some other criteria must be used (i.e., other than highest criterion set forth in block 624) to select which of these sites will be added to the inclusion list. In a preferred embodiment, since unit 704 is currently receiving service from site 708, this site would be added to the inclusion list (to reduce the number of required "re-direct" requests sent). Several alternate embodiments of block 624 are envisioned, such as including the sites which result in the minimum number of redirected units, including sites which maximize the audio quality (i.e., based on measured quality metrics), etc.

At this stage in the processing, the inclusion list includes sites 707 and 708. Thus, unit 702 will be redirected, via its current control site 709, to monitor the control signals from site 707. The call controlling site then performs the normal call set up for sites 707 and 708. Accordingly, site 709 is eliminated from the call, leaving it free to support service requests from other communication units.

Accordingly, the invention might be employed in the manner described above to enhance overall system performance of today's radio communication systems. That is, by reducing the number of communication resources required to service a particular request (e.g., voice call), a larger number of such requests can be serviced using the same number of resources. Such an enhancement provides an opportunity for significant cost savings, improved or expanded coverage, as well as coverage area optimization.

What is claimed is:

1. In a radio communication system having a plurality of sites, wherein each site has a corresponding coverage area, and wherein at least some of the coverage areas overlap with one another, a method of providing a communication path between a first and a second communication unit, comprising the steps of:

A) determining whether the first and second communication units are currently being serviced by different sites;

B) when the first and second communication units are currently being serviced by different sites, determining whether the first and second communication units can both be serviced by a common site; and C) when the first and second communication units are serviceable by a common site, establishing the communication path between the first and second communication units using the common site.

2. The method of claim 1, wherein step B further comprises:

at at least one of the first and second communication units;

B1) receiving a plurality of control signals from at least a primary site among the plurality of sites, which primary site currently provides service to the at least one communication unit;

B2) measuring a quality metric for at least one of said received control signals;

B3) sending said measured quality metrics to a call controlling site;

at the call controlling site;

B4) receiving said quality metrics from the at least one communication unit; and B5) using said received quality metrics to determine whether the first and second communication units can both be serviced by the common site.

3. The method of claim 2, wherein step B2 further comprises the step of measuring a power level for at least one of said received control signals.

4. The method of claim 2, wherein step B2 further comprises the step of measuring adjacent channel interference levels from at least one adjacent site.

5. The method of claim 2, wherein step B3 further comprises the step of routing said measured quality metrics through a primary controller currently providing service to the at least one communication unit.

6. The method of claim 1, wherein step C further comprises the step of redirecting one of the first and second communication units to said common site.

7. In a radio communication system having a plurality of sites, wherein each site has a corresponding coverage area, and wherein at least some of the coverage areas overlap with one another, a method of providing a communication path among a group of communication units, comprising the steps of:

A) establishing an inclusion list which identifies sites to be included in establishing the communication path;

B) determining whether members of the group of communication units can be serviced by only one site of the plurality of sites, and identifying said only one site;

C) when at least one group member can be serviced by only one site, adding said one site to said inclusion list;

D) determining whether remaining group members are currently being serviced by different sites;

E) when said remaining group members are currently being serviced by different sites, identifying a set of common sites which can provide service to said remaining group members;

F) adding said set of common sites to said inclusion list; and

G) establishing the communication path using said identified sites in said inclusion list.

8. The method of claim 7, wherein step E further comprises the step of determining a minimum number of common sites, such that said remaining group members can be serviced by at least one site among said minimum number of common sites.

9. The method of claim 7, wherein step E further comprises:

at at least one of the remaining members of the group of communication units;

E1) receiving a plurality of control signals from at least a primary site which currently provides service to the at least one remaining group member;

E2) measuring a quality metric for at least one of said received control signals;

E3) sending said measured quality metrics to a call controlling site;

at the call controlling site;

E4) receiving said quality metrics from the at least one remaining group member; and E5) using said received quality metrics to determine whether the remaining group members can be serviced by the set of common sites.

10. The method of claim 9, wherein step E2 further comprises the step of measuring a power level for at least one of said received control signals.

11. The method of claim 9, wherein step E2 further comprises the step of measuring adjacent channel interference levels from at least one adjacent site.

12. The method of claim 9, wherein step E3 further comprises the step of routing said quality metrics through a primary controller currently providing service to the at least one remaining group member.

13. A site controller for use in a radio communication system having a plurality of sites, wherein each site has a corresponding coverage area, and wherein at least some of the coverage areas overlap with one another, the radio communication system having at least a first and second communication unit, where the first communication unit requests a communication with the second communication unit, the site controller comprising:

A) means for determining whether the first and second communication units are currently being serviced by different sites;

B) means for determining whether the first and second communication units which are currently being serviced by different sites can be serviced by a common site; and C) means for establishing a communication path through said common site when the first and second communication units are serviceable by a common site.

14. The site controller of claim 13, wherein said means for determining whether those of the first and second communication units can be serviced by a common site further comprises:

B1) means for receiving, from at least one of the first and second communication units, quality metrics of control signals received from at least a primary site which currently provides service to the at least one communication unit; and B2) means for using said received quality metrics to determine whether the first and second communication units can both be serviced by the common site.

15. The site controller of claim 14, wherein said received quality metrics comprises a power level for at least one of said control signals.

16. The site controller of claim 14, wherein said received quality metrics comprises adjacent channel interference levels from at least one adjacent site.

17. The site controller of claim 13, wherein said means for establishing a communication path further comprises means for redirecting one of the first and second communication units to said common site.

18. A site controller for use in a radio communication system having a plurality of sites, wherein each site has a corresponding coverage area, and wherein at least some of the coverage areas overlap with one another, the site controller comprising:
   A) storage means for storing an inclusion list which identifies sites to be included in establishing a communication path among a group of communication units;
   B) means for determining whether members of the group of communication units can be serviced by only one site, and including means for identifying such sites as required sites;
   C) means for altering said inclusion list to include said required sites;
   D) means for determining whether remaining group members are currently being serviced by different sites;
   E) means for identifying, among said different sites servicing those of said remaining group members, a set of common sites which can provide service to said remaining group members;
   F) means for altering said inclusion list to include said set of common sites; and
   G) means for establishing said communication path using said sites identified in said inclusion list.

19. In a radio communication system having a plurality of sites, wherein each site has a corresponding coverage area, and wherein at least some of the coverage areas overlap with one another, a method of providing a communication path between a first and a second communication unit, comprising the steps of:
   A) determining whether the first and second communication units are currently being serviced by different sites;
   B) when the first and second communication units are currently being serviced by different sites, determining whether the first and second communication units can both be serviced by a common site by:
      B1) at the first communication unit, monitoring signals from at least a primary site that currently provides service to the first communication unit;
      B2) measuring at least one quality metric for at least some of the monitored signals;
      B3) using the at least one measured quality metric to determine whether the first and second communication units can both be serviced by the common site; and
   C) when the first and second communication units are serviceable by the common site, establishing the communication path between the first and second communication units using the common site.

20. The method of claim 19, wherein the step of monitoring signals further comprises the step of monitoring control signals from the primary site.

21. The method of claim 20 further comprising the step of monitoring control signals from sites other than the primary site.

22. The method of claim 20 further comprising the step of receiving signal quality metrics from sites other than the primary site.

* * * * *